Aug. 17, 1937.  H. W. KEEVIL  2,089,967
METHOD AND APPARATUS FOR DETECTING FLAWS IN METALLIC BODIES
Filed July 22, 1933  2 Sheets-Sheet 1
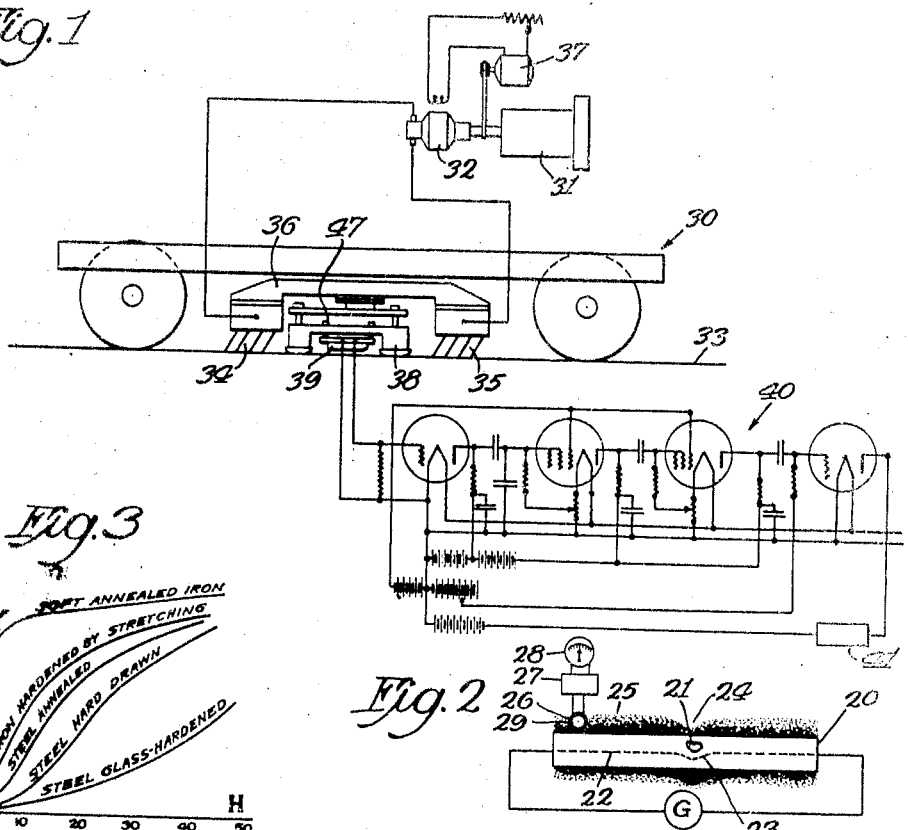
Inventor:
Henry W. Keevil Aug. 17, 1937.     H. W. KEEVIL     2,089,967
METHOD AND APPARATUS FOR DETECTING FLAWS IN METALLIC BODIES
Filed July 22, 1933     2 Sheets-Sheet 2
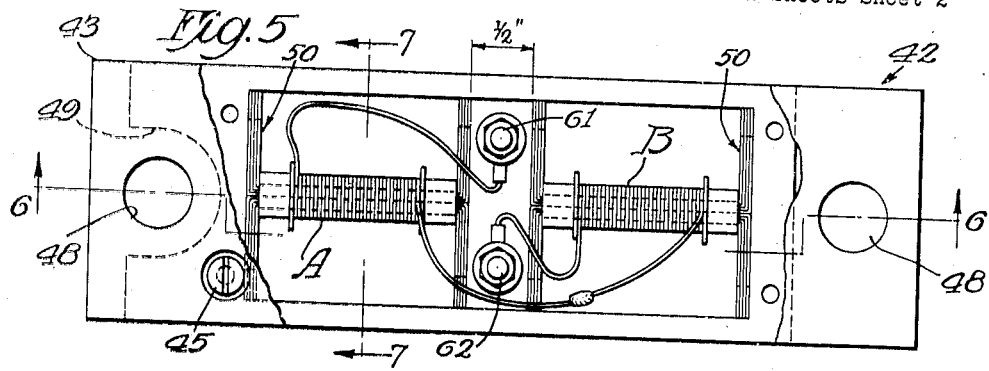
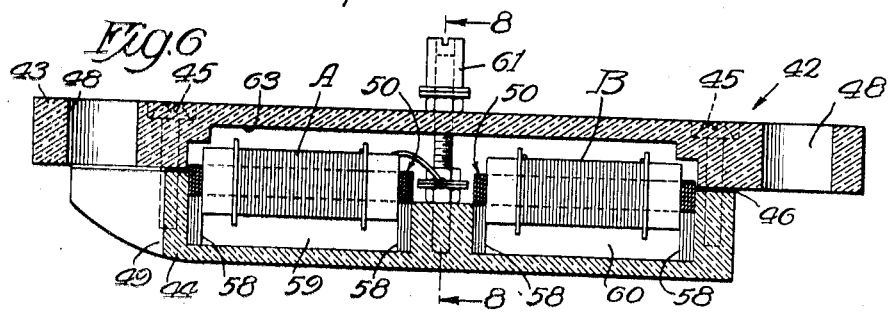
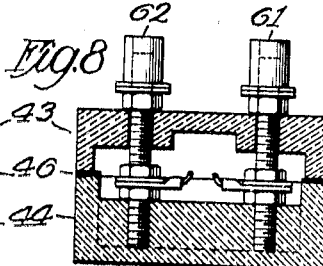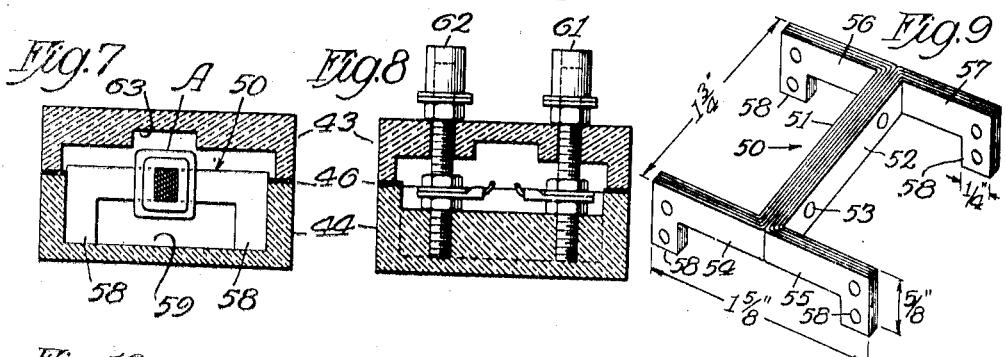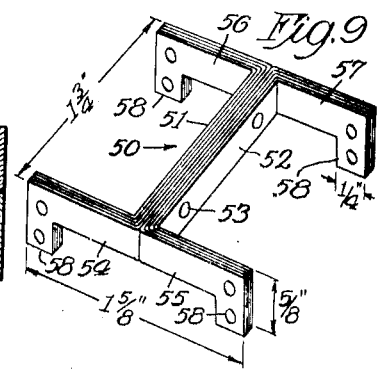
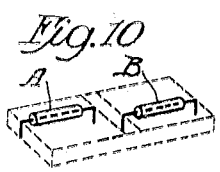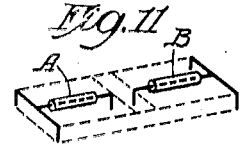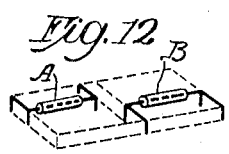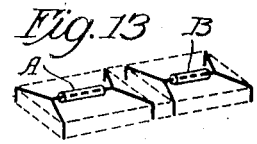
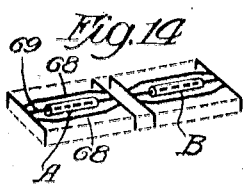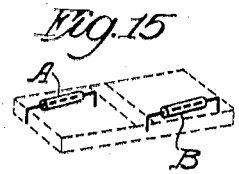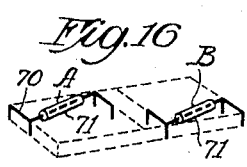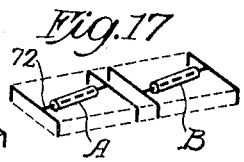
Inventor
Henry W. Keevil
By Gillson Mann & Cox
Attys.

Patented Aug. 17, 1937

2,089,967

UNITED STATES PATENT OFFICE 2,089,967

METHOD AND APPARATUS FOR DETECTING FLAWS IN METALLIC BODIES

Henry W. Keevil, Highland Park, Ill.

Application July 22, 1933, Serial No. 681,730

20 Claims. (Cl. 175—183)

It is known that latent, as well as patent, flaws in steel rails, bars, and other metallic bodies can be detected with a fair degree of accuracy by passing a low voltage, high amperage current through the metallic body under test, and then exploring the magnetic field set up by the current for variations or non-uniformities which may generally be taken as indicating the presence of a flaw. Sometimes, however, distorted magnetic fields may be caused by physical characteristics of the body other than true flaws, as for example, surface imperfections.

The device that is used for exploring the magnetic field is commonly called a "detector" or "pick up" and it usually consists of a coil mounted transversely of the body, and movable parallel to the longitudinal axis of the body so that whenever the coil traverses a weakened or strengthened magnetic field, a current will be induced in the coil. Suitable amplifying apparatus is used to permit the feeble induced currents to be duly recorded.

Three major difficulties have been experienced in the practical application of the above described method to the testing of steel rails. First of all, it has been found that the detector will not give an indication of flaws that are located in certain parts of the rail, or are of small extent. Also, it has been found that the recording apparatus gives false indications, and is generally erratic when the detector is used on a rail having a "corrugated" upper surface, a condition that often obtains after a rail has been subjected to certain kinds of wear. Thirdly, undesirable and confusing indications are obtained from wheel burns, grease spots, and other inconsequential surface imperfections.

The principal object of this invention, therefore, is to overcome these objectional characteristics and to provide an improved detector which will accurately record flaws in the rails under all conditions of service.

Further and other objects and advantages will become apparent as the disclosure proceeds and the description is read in conjunction with the accompanying drawings, in which Fig. 1 is a diagrammatic view showing a test car equipped with the apparatus of this invention;

Fig. 2 is a view that will be used in discussing the theory underlying the method and apparatus of this invention;

Fig. 3 shows the magnetization curves for iron and steel, the abscissas representing units of magnetomotive force, and the ordinates, units of field density;

Fig. 4 illustrates how the improved detector operates in locating a flaw in a rail;

Fig. 5 is a plan view of the detector shoe with a part broken away to expose the detector coils;

Fig. 6 is a longitudinal, sectional view taken on the line 6—6 of Fig. 5;

Fig. 7 is a transverse, sectional view taken on the line 7—7 of Fig. 5;

Fig. 8 is a transverse, sectional view taken on the line 8—8 of Fig. 6;

Fig. 9 is a perspective view of the core piece that is preferably used; and

Figs. 10–17 are diagrammatic views illustrating modified forms of the invention.

It will be understood that the specific embodiments of the invention that are illustrated in the drawings and will hereafter be described are merely preferred forms of the invention chosen to facilitate disclosure, and are not to be used to impose limitations upon the appended claims except as may be required by the prior art.

Before describing in detail the illustrative embodiments of the invention, it will be helpful to analyze briefly the theory which is believed to underly the present invention, although all theoretical discussions in this specification are to be construed, not as defining a mode of operation, but merely as a possible explanation of certain physical, electrical or magnetic phenomena known to exist.

Referring first to Fig. 2, the reference character 20 designates an elongated, metallic body having a flaw 21 adjacent its upper surface. If a current of electricity is passed from one end of the body to the other, for example, from left to right, the center of current flow will follow roughly the dotted line 22. As will be seen, the center of current flow makes a dip at 23 (assuming that the flaw 21 has relatively high resistance) so that the magnetic field surrounding the body 20 will be distorted, and in this case weakened, at 24. The magnetic field is represented by small dots 25 which may be considered as lines of force encircling the body 20 in a clockwise direction when viewing the body from the left end.

If a coil 26 moving parallel to the longitudinal axis of the body 20 is connected through an amplifier 27 to a recording instrument 28, it will be found that no current will be induced in the coil until it comes upon the weakened field 24. When this point is reached, however, the magnetic flux through the coil 26 is suddenly decreased, and an electromotive force is induced in the coil 26 which is amplified and recorded on the instrument 28, thereby indicating the presence of a flaw in the body 20.

If the current through the body 20 is of high amperage so that the magnetic field surrounding the body is exceptionally strong, the magnetic core 29 in the coil 26, may be, and probably will be, close to magnetic saturation, particularly if it is made of a material which saturates at low flux densities. The curves shown in Fig. 3 were taken from the Electricians Handy Book, written by T. O'Connor Sloane, and published by the Norman W. Henley Publishing Co. in 1905, and these curves indicate that when magnetic substances approach saturation, as for example soft annealed iron, relatively large changes in magnetomotive force (H) will produce but slight changes in magnetic flux (B), and since the current induced in the coil 26 is directly proportional to the change in magnetic flux through the coil, it is entirely possible that even relatively large changes in magnetomotive force, as produced by the diversion of current around the flaw, would be undetected by the coil.

Stated in other words, when the coil 26 is set transversely to the body 20, as shown in Fig. 2, and the current through the body is of such strength that the core 29 is highly magnetized, the coil will not be particularly sensitive to variations in magnetomotive force.

In the present invention, the coil and core are so arranged that under normal circumstances, the core is demagnetized, or at most only slightly magnetized, and as the core is consequently operating on the rapidly ascending portion of the magnetization curve, as indicated between O and Y, (Fig. 3) slight changes in magnetomotive force produce relatively large changes in magnetic flux. It is this fact particularly which is thought to account for the increased sensitivity and greater accuracy of the detecting apparatus that constitutes the subject matter of this invention.

Another possible explanation is that a transverse fissure, because of the minute separation of metal at the fissure, becomes polarized when the magnetic field is set up by the passage of current through the rail or otherwise, and that the longitudinal flux resulting from this polarization of the fissure readily induces a current in the induction coil due to its longitudinal arrangement over the rail and the core associated with it.

Referring now to Fig. 1, a test car is diagrammatically indicated at 30 and is equipped with a gasoline engine 31 driving a generator 32, which, in turn, supplies direct current of low voltage and high amperage (preferably ½ volt and 2500 amperes) to the rail 33 through brushes 34 and 35, supported at opposite ends of a frame 36. The field of the generator 32 is controlled by an exciter 37, also driven by the engine 31.

Suspended from the frame 36, but insulated therefrom, is a smaller frame 38 which is adapted to ride upon the track 33 and support a detector 39 in proximity to, but out of contact with, the track 33. The detector is responsive to the magnetic field set up by the high amperage current passing through the rail, and whenever it traverses a distorted or non-uniform field, a potential is induced in the coil which is amplified by suitable thermionic apparatus, generally indicated at 40, the last stage of which operates a recording instrument 41 of suitable construction. Preferably variations in the magnetic field are graphically recorded by the instrument 41 so as to produce a permanent record.

It will be understood that the apparatus suspended from the car underframe, as well as the amplifying and recording apparatus, is duplicated on the opposite side of the car, so that both rails of the track are checked for flaws.

The operating elements of the detector 39 are housed within a shoe 42 consisting of top and bottom blocks 43 and 44 held together by countersunk machine screws 45. Both blocks are preferably made of black linen base Bakelite and have a rubber fabric gasket 46 interposed between the blocks when assembled to form a water tight seal.

The shoe 42 is suspended from the frame 38 by bolts 47 which pass through apertures 48 provided at both ends of the top block 43. The lower block 44 is suitably recessed, as indicated at 49, to accommodate the bolt at the front end of the shoe.

Two detector coils A and B are mounted in the shoe and in order to compensate for variations in the current that is applied to the rails, the coils are connected in opposition to each other. As a result, any change in the field strength due to current variations will induce equal and opposite electromotive forces in the coils, and as the coils are connected in opposition, no current will flow.

The coils A and B are each provided with a suitable core piece, and in the form of the invention shown in Figs. 4–9 inclusive, this core piece, generally designated 50, is H-shaped and comprises two similar U-shaped portions 51 and 52 that are riveted together as indicated at 53. The parts of the two halves which are secured together constitute the actual core of the induction coil, and both ends of the composite core project from the coil and then divide to form laterally extending arms 54, 55, 56 and 57, each of which terminates in a downwardly extending leg portion 58.

It is desirable to have the bridge or actual core which connects the laterally extending arms laminated in longitudinal vertical planes, so that it will have greater reluctance to the transverse field than the arms. For the same reason, it may be desirable in some cases to have the arms 54 and 55 and 56 and 57 unlaminated, or if laminated, to have the laminations continuous throughout adjacent arms (54 and 55, and 56 and 57) in order to reduce their reluctance to the magnetic flux.

The coils A and B, with their core pieces, fit within cavities 59 and 60 provided in the bottom block 44 of the detector shoe. The coils are connected in series, as shown in Fig. 5, but are in opposition to one another. Suitable binding posts 61 and 62, secured in the upstanding partition between the cavities 59 and 60, are provided for connecting the coils to the amplifying apparatus shown in Fig. 1.

The upper block 43 of the detector shoe is cored out, as indicated at 63, to accommodate the two coils mounted in the cavities 59 and 60. When the top block 43 is secured to the lower block 44, the two coils are completely enclosed within a weatherproof housing and are, therefore, not subjected to the deteriorating effects of weather conditions.

Since the particular arrangement of the coils shown in Figs. 5–8 inclusive and the use of the core piece 50 has been proven satisfactory in service, even to the extent that it does not give false indications when the detector shoe is passing over a rail having a corrugated upper surface, a few dimensions are given in the drawings merely for the purpose of disclosure, for it is not definitely known why the coil erases the false indications that are usually obtained when the car is passing over a corrugated rail.

In operation, the coils A and B, each equipped with a core 50, are moved longitudinally of the rail, as indicated in Fig. 4. As long as the portion of the rail adjacent to the coils has a homogeneous structure or composition, no current is induced in the coils, or if induced by reason of variations in the strength of the operating current, the currents will be equal and opposite, and will produce no effect on the recording instrument 41. It is believed that the diverging arms 54 and 55, and 56 and 57 of the cores 50 are ordinarily close to magnetic saturation, being parallel to the direction of the magnetic field, and that in consequence, there are stray magnetic fields which pass in both directions through the center of the coils, but which being equal and opposite, induce no current in the associated coils.

Let us suppose, however, that the detector in moving in the direction of the arrow, Fig. 4, comes upon a flaw 64; the center of current flow through the rail 65, ordinarily at 66, is lowered to 67, assuming that the flaw 64 has relatively high resistance. This lowering of the line of current flow results in a weakened magnetic field at the surface of the rail so that the arms 54 and 55 of the core 50 of coil A are then in a weaker magnetic field than the arms 56 and 57 of the same core. They are also in a weaker field than the entire core of the coil B. Since the amount of stray field is a function of permeability, and since permeability is in turn a function of magnetization, it is believed that the weakening of the field at the front end of the coil A reduces the magnetic field through the coil in a rearward direction. This unbalancing of the opposed stray fields through the coil induces a current in coil A which is suitably recorded by the instrument 41.

As the detector moves along the rail, the rear end of the core 50 of coil A moves over the weakened magnetic field, while the forward end re-enters the normal field, and consequently there is a magnetic surge through the coil in the opposite direction which causes the indicator 41 to move correspondingly. A similar cycle of reaction takes place in coil B as it passes over the distorted field.

Much speculation could be made concerning the exact path that the magnetic field takes in passing through the coils A and B, but since it is merely speculation, there is no necessity for going into detail. It would seem, however, that if the current is flowing through the rail 65 from left to right (Fig. 4) resulting in a magnetic field encircling the rail in a clockwise direction, when viewed from the left, at least a portion of the magnetic flux would enter the core through the leg 58 of the arm 54, pass rearwardly through the coil, and then emerge from the core through the leg 58 of the arm 57. Likewise a stray field in the opposite direction would probably be set up by a portion of the magnetic flux entering through the arm 56, passing through the coil and thence through the arm 55.

It is obvious that the shape of the core may vary within rather wide limits and still accomplish the principal objects of this invention. If it be correct that the improved results are produced by using the lower portion of the magnetization curve (i. e. by arranging the coil so that the core is normally only slightly magnetized) or by placing the coil in a position where it is particularly responsive to the longitudinal magnetic flux at the faces of polarized transverse fissures, it would seem that any arrangement whereby these ultimate results are obtained, in part or in full, would be within the broad scope of the invention.

For example, in Figs. 10-17, inclusive, diagrammatic representations of modified forms of the invention are shown, which accomplish in varying degrees the objects of this invention.

In Fig. 10, the cores are I-shaped in plan; in Fig. 11, T-shaped; and in Fig. 12, U-shaped.

In Fig. 13, the cores resemble the H-shaped core of Fig. 9 except that the arms are at an angle of less than 180°.

In Fig. 14, the H-shaped core of Fig. 9 is shown, but is equipped with a magnetic shield, generally designated 68, which prevents the magnetic flux from passing transversely across the actual core or connection 69. In this way, the cross member is kept farther away from magnetic saturation.

In Fig. 15, the arrangement is substantially the same as shown in Fig. 10 with the exception that the coils are not quite parallel to the longitudinal axis of the rail. The purpose of the arrangement is to cause the coil itself to cut the field of force so as to produce a current, but at the same time prevent the core from becoming saturated.

In Fig. 16, the arrangement of Fig. 10 is modified by providing laterally extending arms 70 at the ends of the projecting core. The coils 71, as in Fig. 15, are at a slight angle with respect to the longitudinal axis of the rail.

The arrangement in Fig. 17 illustrates H-shaped cores with the cross bars 72 at a slight angle to the longitudinal axis of the rail.

Many other forms of the invention could be shown, but it is believed that the scope of the invention has been sufficiently indicated by the several embodiments which have been illustrated and described. Obviously more than two coils arranged staggered or in tandem could be used, if desired.

Recent tests have shown that the detecting apparatus of this invention substantially eliminates all false indications due to rail corrugations, and to a somewhat lesser degree, false indications produced by inconsequential driver burns and other unimportant surface abnormalities. As a result, it is possible to test more track mileage per day and the records are far more accurate and are less apt to be confusing. The substantial erasure of false indications in addition to the increase in sensitivity makes this invention a noteworthy contribution to the art of flaw detecting.

It is obvious that the detecting apparatus of this invention may be used to advantage when the magnetic field associated with the rail is produced by means other than the passage of electrical current through the rail.

Throughout the appended claims, the expression "transversely of the rail" and words of like import, are used in the sense that the projection on the core extends laterally in a direction substantially parallel to the adjacent surface of the body under test.

What I claim, therefore, is:

1. The method of detecting flaws in rails, bars, and the like, which consists in passing an electrical current longitudinally through the body under test, and then exploring the magnetic field surrounding the body with a coil having its axis maintained parallel to the axis of the rail and having a core projecting from both ends thereof with portions extending transversely of the rail.

2. A detector for locating flaws in elongated metallic bodies through which an electrical current is flowing, said detector comprising a coil having its axis parallel to the longitudinal axis of the body under test, and a core for said coil having end portions extending transversely of the body.

3. A detector for locating flaws in elongated metallic bodies through which an electrical current is flowing, said detector including a pair of coils having cores which project from opposite ends of the coils and terminate in diverging arms extending transversely of the body.

4. A detector for locating flaws in elongated metallic bodies through which an electrical current is flowing, said detector including a pair of coils having H-shaped cores, the arms of which extend transversely of the body and are provided at their ends with downwardly extending legs.

5. In a detector for locating flaws in metallic bodies with which a magnetic field is associated, the combination of a coil and a magnetic core extending through the coil and terminating at one end with arms extending laterally in a direction substantially parallel to the adjacent surface of the body under test.

6. In a detector for locating flaws in metallic bodies with which a magnetic field is associated, the combination of a coil, a magnetic core extending through the coil and terminating at one end with diverging arms, and means for restraining flux from passing from arm to arm.

7. In a detector for locating flaws in metallic bodies with which a magnetic field is associated, the combination of a coil and a magnetic core extending through the coil and terminating at one end with diverging arms, one of said arms and a portion of the core being formed separate from the other arm and the remainder of the core.

8. In a detector for locating flaws in metallic bodies with which a magnetic field is associated, the combination of a coil and a magnetic core extending through the coil and having end portions extending laterally in a direction substantially parallel to the adjacent surface of the body under test.

9. In a detector for locating flaws in metallic bodies with which a magnetic field is associated, the combination of a coil and a magnetic core extending through the coil and having laterally projecting end portions terminating in downwardly extending feet.

10. In a detector for locating flaws in metallic bodies with which a magnetic field is associated, the combination of a coil and a magnetic core extending through the coil having laterally projecting end portions, and downwardly extending feet in alinement with the coil and at the ends of the laterally projecting portions.

11. In a detector for locating flaws in metallic bodies with which a magnetic field is associated, the combination of a pair of coils each of which is positioned with its axis parallel to the longitudinal axis of the body, and both coils being movable longitudinally with respect to the body, and cores associated with said coils, the core associated with one coil having a laterally extending end portion projecting towards one side of the body, and the core associated with the other coil having a laterally extending end portion projecting toward the other side of the body.

12. In a detector for locating flaws in metallic bodies with which a magnetic field is associated, the combination of a coil, a core passing through the coil and having laterally projecting arms at one end and a downwardly extending foot at the other end.

13. The method of detecting flaws in rails, bars, and the like which consists in setting up a magnetic field in the vicinity of the body under test and then exploring the magnetic field surrounding the body with a coil having its axis parallel to the axis of the rail, and having a core projecting from one end thereof with portions extending transversely of the rail.

14. A detector for locating flaws in elongated metallic bodies with which a magnetic field is associated, said detector including a pair of coils having cores which project from opposite ends of the coils and terminate in diverging arms extending transversely of the body.

15. A detector for locating flaws in elongated metallic bodies with which a magnetic field is associated, said detector comprising a coil having its axis parallel to the longitudinal axis of the body under test, and a core for said coil having end portions extending transversely of the body.

16. In apparatus for detecting transverse fissures in rails, bars and the like, comprising means for polarizing the faces of the fissures to set up a longitudinal flux therebetween, a detector coil having a core extending longitudinally of the body under test and projecting from one end of the coil with a portion thereof extending laterally in a direction substantially parallel to the adjacent surface of the body to form a lateral extension of the core.

17. In apparatus for detecting transverse fissures in rails, bars and the like, comprising means for polarizing the faces of the fissures to set up a longitudinal flux therebetween, a detector coil having a core extending longitudinally of the body under test and projecting from one end of the coil, with a portion thereof extending laterally in a direction substantially parallel to the adjacent surface of the body to form a lateral extension of the core, and a downwardly extending foot on the projecting part of the core.

18. In a detector for locating flaws in metallic bodies with which a magnetic field is associated, the combination of a coil positioned adjacent to the body under test, a core extending longitudinally of the body under test and projecting from one end of the coil and comprising a plurality of laminations which at said end of the core extend laterally in a direction substantially parallel to the adjacent surface of the body to form a lateral extension of the core.

19. In detecting apparatus for locating flaws in a body through which an electrical current is flowing including a recorder and a thermionic amplifier associated with the recorder, the combination therewith of a detector for operating the amplifier and recorder, said detector comprising a pair of oppositely connected coils adapted to be moved along the body and arranged with their longitudinal axes substantially parallel to the longitudinal axis of the body under test, each coil having a magnetic core projecting therethrough with their adjacent ends sufficiently close to one another so that the amplifier may be set to a relatively high sensitivity without causing a vitiating number of false indications to be recorded on the recorder, the adjacent ends of said cores each being provided with a projection extending laterally in a direction substantially parallel to the adjacent surface of the body under test.

20. In detecting apparatus for locating flaws in a body through which an electrical current is flowing, including a recorder and a thermionic amplifier associated with the recorder, the combination therewith of a detector for operating the amplifier and recorder, said detector comprising a pair of oppositely connected coils adapted to be moved along the body and arranged with their longitudinal axes substantially parallel to the longitudinal axis of the body under test, each coil having a magnetic core projecting therethrough with their adjacent ends sufficiently close to one another so that the amplifier may be set to a relatively high sensitivity without causing a vitiating number of false indications to be recorded on the recorder.

HENRY W. KEEVIL.